United States Patent [19]
Jeppson et al.

[11] Patent Number: 5,416,648
[45] Date of Patent: May 16, 1995

[54] MASTERLESS SYNCHRONIZED SPINDLE CONTROL FOR HARD DISK DRIVES

[75] Inventors: David B. Jeppson, Livermore; Benjamin M. Miller, San Jose, both of Calif.

[73] Assignee: Quantum Corporation, Milpitas, Calif.

[21] Appl. No.: 36,823

[22] Filed: Mar. 25, 1993

[51] Int. Cl.$^6$ ............................................. G11B 27/19
[52] U.S. Cl. .................................. 360/73.02; 318/85
[58] Field of Search ................. 360/73.02, 73.03, 38.1, 360/78.09; 318/85, 625, 53, 41, 69, 79, 80, 672

[56] References Cited

U.S. PATENT DOCUMENTS

| | | | |
|---|---|---|---|
| 3,893,178 | 7/1975 | Sordello | 360/73.02 |
| 4,488,189 | 12/1984 | Axmear et al. | 360/78.09 X |
| 4,816,937 | 3/1989 | Fukushima | 360/73.03 |
| 4,833,664 | 5/1989 | Shiragami et al. | 369/54 X |
| 4,907,105 | 3/1990 | Kurzweil, Jr. | 360/73.02 |
| 5,128,810 | 7/1992 | Halford | 360/39 |
| 5,303,097 | 4/1994 | Baba et al. | 360/73.02 |

OTHER PUBLICATIONS

Gibson, *Redundant Disk Arrays: Reliable Parallel Secondary Storage*, MIT Press ©1992 p. 77.

*Primary Examiner*—Aristotelis Psitos
*Assistant Examiner*—James T. Wilson
*Attorney, Agent, or Firm*—David B. Harrison

[57] ABSTRACT

A hard disk drive spindle synchronization method comprises the steps of: sending an index marker pulse generated within each disk drive to mark in time a beginning of each rotation of the disk spindle thereof to a party line to which all drives are connected, rotating the disk spindle at a slightly different rotational velocity than any other drive of the array, monitoring drive pulses present on the spindle reference party line from other disk drives of the plurality to locate a center of gravity of pulse clusters which is within approximately plus or minus one quarter revolution of the drive's own index marker pulse, upon detection of a said center of gravity, ceasing to rotate the disk spindle at a slightly different rotational velocity during a second phase, adjusting the rotational phase of each drive to converge toward the center of gravity until all drive pulses present on the spindle reference party line converge into a single composite marker pulse present on the spindle reference party line, and maintaining convergence of the drive pulses during continuing operations of the disk drives by monitoring the spindle reference party line and making slight phase adjustments of the rotational phase of each drive, thereby phase locking all of the disk spindles of the plurality of hard disk drives to a single composite index marker signal present on the party line.

10 Claims, 7 Drawing Sheets

MASTERLESS SYNCHRONIZED SPINDLE CONTROL FOR HARD DISK DRIVES

FIELD OF THE INVENTION

The present invention relates to methods and apparatus for synchronizing rotational phase of motors to a common reference. More particularly, the present invention relates to methods and apparatus for synchronizing disk spindle motors within hard disk drives which are connected together by a single signal line and without requiring one of the disk drives to be designated as a master unit.

BACKGROUND OF THE INVENTION

A once-per-revolution index marker is conventionally generated within disk drives to mark in time the beginning of each concentric data track. The index marker also marks in space a beginning of the concentric data tracks formed on the data storage surface. Thus, "index" denotes both an electrical signal and a common physical reference location on the data storage surface. The index marker signal may be generated by sensing a feature, such as a reluctance-altering slug or insert, of a disk spindle with a suitable sensor. It may be generated by electro-optical sensing of a hole in a rotating floppy disk. It may also be generated by sensing a prerecorded data feature in each recorded data storage track. The index marker signal not only designates track beginning, it is repetitively monitored and compared with a timer to assure that the disk is rotating at a desired angular velocity.

A data track is usually divided into a series of data sectors. In fixed block length designs, the sector length corresponds to the data block length (plus certain overhead information relating to head positioning, sector identification, and data block error correction coding information, for example). When a particular data track is selected, it may be necessary to wait until the particular sector of interest passes beneath the data transducer head. This delay is known in the art as "rotational latency". Average latency is the time, on average, required to reach the sector of interest. Usually, average latency is equal to the time period for one half of one revolution of the data storage disk.

Frequently, hard disk drives are linked together to form data storage arrays. When a record is sufficiently large, or when the record is recorded near the end of the user data space of one disk drive and spills over onto a subsequent drive in order, it is necessary to switch recording (or playback) operations from one drive to another. If the disk spindles are not phase synchronized, meaning that the index markers of both drives are not in rotational alignment, a rotational latency will be incurred during the switchover from the first drive to the second drive, before the recording (or playback) operation may be resumed. The latency can be reduced or eliminated if the disk spindles rotate so that their respective index markers occur at the same time.

In addition to the problem with incurring rotational latencies in switching from drive to drive, there are some computing applications which require greater effective bandwidth than is provided by a single disk drive. Data-intensive computer applications include large graphics databases, wideband data communications, and video data storage and editing, as some examples. In order to provide increased bandwidth data storage and retrieval, several approaches have been followed.

One approach is to divide each user data word up into several segments, such as three or four bits, and record each segment in a disk drive of the array. In the three bit example, three drives would be employed for a byte-length data word, with one drive also recording a parity bit.

Another approach assigns each bit line of a parallel data path to a particular disk drive, and data transfer operations are carried out simultaneously between a plurality of disk drives arranged as an array. Eight disk drives are operated synchronously in order to provide storage on a byte-by-byte basis, rather than bit-by-bit in the case of a single drive. A synchronized ninth drive facilitates recording of a parallel parity bit for each byte. Parallel disk drive arrays require that spindles become, and remain, synchronized. As the spindle synchronization tolerance becomes reduced, less temporary buffering of data is required in order to accommodate the spindle speed tolerance.

There have been prior efforts to achieve spindle synchronization. One exemplary approach of the prior art is described in U.S. Pat. No. 3,893,178 to Sordello, entitled: "Synchronization of Multiple Disc Drives". This approach defined one disk drive as the master, and required that its spindle speed be set very carefully, preferably under manual control. A second disk drive was denoted the slave. Index markers from the master and the slave were generated and compared to develop a digital pulse width interval corresponding to the amount of rotational error between the two spindles. The variable-width pulse was then converted into a charge/discharge analog ramp which was applied to a slave motor speed control of the slave drive to speed up or slow down the slave spindle motor. Once the pulse went to zero-width, the slave spindle index marker was aligned rotationally with the master index marker, and "phase lock" was achieved. This approach works well, but requires special synchronization circuitry within each disk drive, as well as separate index marker lines from the master and slave drives to the synchronization circuit.

A more recent proposal for spindle synchronization is found in U.S. Pat. No. 4,907,105 to Kurzweil, Jr., entitled: "Synchronized Spindle Control for Disk Drives". In this approach, one drive is designated as the master drive, and all other drives are designated as slave drives. An output signal from a speed control loop of the master drive is input to each slave drive. The incoming master signal is summed with the slave's own spindle marker signal to generate an error correction signal which is used by the slave's speed control loop to speed up or slow down the rotation of the slave drive spindles, until their index markers are synchronized with the index marker of the master drive. This approach also required designation of one disk drive as master by setting a jumper or making some other switch setting, and also required special circuitry at each slave to achieve synchronism and phase lock with the master drive's index marker signal. If the master drive failed in service, all spindle synchronization was lost until a new master could be manually selected by a service technician, etc.

The use of an array of disk drives with synchronized spindles to emulate performance of a single high data transfer rate virtual disk drive is described in U.S. Pat. No. 5,128,810 to Halford, entitled: "Single Disk Emulation Interface for an Array of Synchronous Spindle Disk Drives". A single disk drive controller receives data words at high speed from a supercomputer. The controller divides the data words up into subparts, and sends each subpart to a separate disk drive for storage. The controller also generates a master once-per-revolution clock reference signal which is broadcast to all of the individual drives in order to force spindle synchronization. Details concerning methods for achieving synchronization within each disk drive with the externally supplied master clock reference signal are not provided.

These references illustrate the widening need for disk drive spindle synchronization, so that plural disk drives rotating in unison may effectively be employed within a drive array. However, a hitherto unsolved need has remained for a spindle synchronization method which does not require an external master clock reference signal, or designation of one drive as a master and the other drives as slaves, or a number of dedicated control lines between the drives comprising the array.

SUMMARY OF THE INVENTION WITH OBJECTS

A general object of the present invention is to provide spindle synchronization within an array of disk drives without the need to designate a master or refer to an external master reference clock in a manner which overcomes limitations and drawbacks of the prior art.

A more specific object of the present invention is to provide disk spindle synchronization within an array of disk drives in a manner facilitating removal of drives from, and addition of drives to, the array without requiring any hardware modifications to any of the drives.

Yet another specific object of the present invention is to provide simplified circuitry using a single spindle synchronization party line in order to achieve spindle synchronization within an array of like-kind disk drives.

One more specific object of the present invention is to provide an array of disk drives with a fault tolerant spindle synchronization method which continues to function even if one or more of the disk drives of the array cease providing a spindle synchronization signal.

Another specific object of the present invention is to provide a simplified masterless synchronized spindle control for each disk drive of an array which requires very little additional hardware within each drive, which effectively utilizes the drive's microcontroller and simple control program routines, and which requires only one spindle synchronization party line.

Yet another specific object of the present invention is to provide a reliable and robust index marker signal within a disk drive and a small amount of additional circuit logic for supporting masterless synchronized spindle control when the drive is included within an array of like drives.

In accordance with one aspect of the present invention, a method is provided for causing data storage disk spindles of a plurality of hard disk drives connected together by a single spindle reference party line to operate in phase synchronism at a predetermined rotational velocity and without designation of one of said drives as a master drive comprising within each drive of the plurality. The method comprises the steps of:

sending an index marker pulse generated within each disk drive to mark in time a beginning of each rotation of the disk spindle thereof to the party line, rotating the disk spindle at a slightly different rotational velocity from every other drive of the plurality, monitoring drive pulses present on the spindle reference party line from other disk drives of the plurality to locate a center of gravity of pulse clusters which is within approximately plus or minus one quarter revolution of the drive's own index marker pulse, upon detection of a said center of gravity, ceasing to rotate the disk spindle at a slightly different rotational velocity during a second phase, adjusting the rotational phase of each drive to converge toward the center of gravity until all drive pulses present on the spindle reference party line converge into a single composite marker pulse present on the spindle reference party line, and maintaining convergence of the drive pulses during continuing operations of the disk drives by monitoring the spindle reference party line and making slight phase adjustments of the rotational phase of each drive, thereby phase locking all of the disk spindles of the plurality of hard disk drives to a single composite index marker signal present on the party line.

In one aspect of the present invention the step of rotating the disk spindle at a slightly different rotational velocity from every other disk drive of the plurality comprises the step of offsetting the predetermined rotational velocity by a fractional amount derived from a unique number value assigned to each drive of the plurality. As a related aspect, the unique number value is a disk drive interface number which is preset to identify the hard disk drive and to distinguish it from others connected to the interface. In one example, the number may be a SCSI ID number.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

In FIG. 1, details of Drive 1 and Drive 2 are provided, whereas Drives 3–5 are symbolized as single blocks.

DETAILED DESCRIPTION OF A PREFERRED EMBODIMENT

Figure 1:
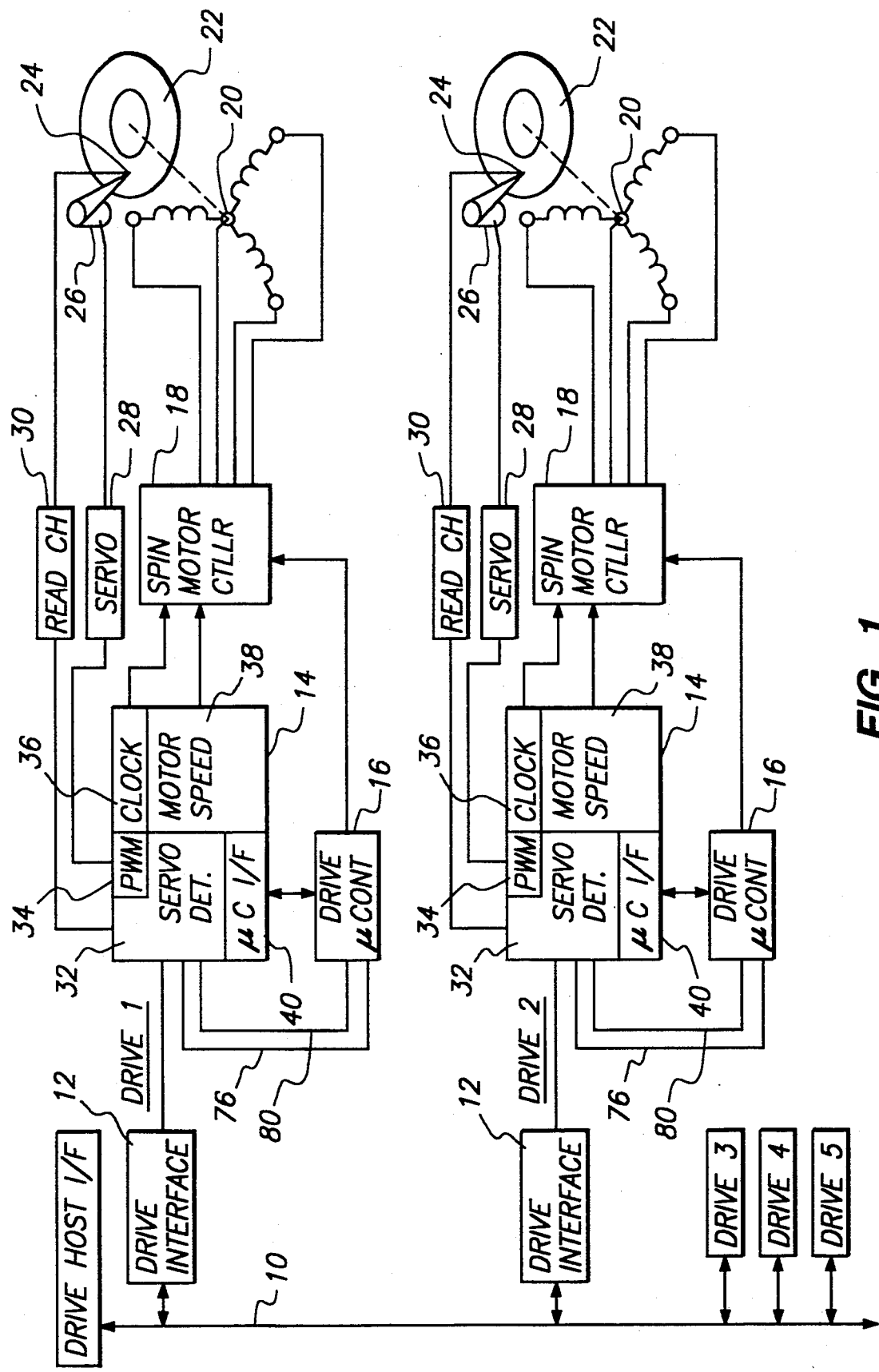
FIG. 1 is a block diagram of an array of five like-kind hard disk drives which implement a masterless synchronized spindle control in accordance with principles of the present invention.

Masterless synchronization of disk spindles in accordance with the present invention is achieved by connecting each of the disk drives of an array to a spindle synchronization party line 10. In the FIG. 1 example, there are five hard disk drives, drive 1, drive 2, drive 3, drive 4, and drive 5. Structural details pertinent to the present invention of drives 1 and 2 are set forth to show that the drives follow essentially identical architectures. The drives 1-5 are of like data storage capacity, actuator access times, spindle rotation speed, and data storage format. Preferably, although not necessarily, the drives 1-5 are identical units within a product family. While there may be differences among drives of the array, essentially all of the drives rotate disks at the same nominal angular velocity.

Each drive 1-5 includes a drive interface 12 which includes a path to a bus including the spindle synchronization party line 10. The bus typically extends to a drive-to-host interface, such as a SCSI initiator controller, for example. In this example, the drive interface 12 may implement a SCSI target interface protocol, IDE interface protocol, PCMCIA interface protocol, or some other interface specification. In accordance with the predetermined interface protocol, each drive is assigned a unique number to differentiate it from every other drive which is connected to the interface.

Each drive 1-5 also includes a disk drive electronics chip 14, a programmed microcontroller 16, a spin motor controller 18, a three-phase DC brushless spindle motor 20, at least one data storage disk 22 which is rotated by the spindle motor 20 at a constant angular velocity, e.g. 4500 RPM, a data slider-transducer 24 which flies upon an air bearing slightly above the surface of the disk 22 in accordance with Winchester technology, a rotary voice coil actuator structure 26 for positioning the head 24, a servo driver circuit 28 for operating the rotary voice coil actuator 26, and a read/write electronics channel 30 which includes data separation and peak detection functions.

The disk drive electronics chip 14 includes functions such as buffer memory controller, sequencer, data encoder/decoder. In relation to an understanding of principles of the present invention, it is important to note that the chip 14 also includes a servo detector 32, a pulse width modulator 34, a drive master clock 36, a motor speed supervisor circuit 38, and a microcontroller interface 40.

Each data storage surface of the disk 24 defines a pattern of prewritten information including a plurality of embedded servo sectors which contain track identification information along with track centering information. One presently preferred pattern for embedded servo sectors is disclosed in commonly assigned U.S. Pat. No. 5,170,299 to Moon, entitled "Edge Servo for Disk Drive Head Positioner", the disclosure thereof being incorporated herein by reference. One of the fields present in each servo sector is an index field. In one and only one of the sectors, the index field pattern is different, thereby denoting the location of the once-per-revolution index marker.

The servo detector 32 is adapted to detect and decode the servo sector fields, including the index field and to generate either a hard index signal (meaning that the last index field pattern has actually been detected) or a soft index signal (which results upon overflow of an index counter within the servo detector which is set by the latest hard index signal and when it has reached a count equal to the nominal index interval). One presently preferred implementation of the servo detector is described in commonly assigned, copending U.S. patent application Ser. No. 07/710,172 to Moon et al. entitled: "Servo Data Recovery Circuit for Disk Drive Having Digital Embedded Sector Servo", the disclosure thereof being incorporated herein by reference. Preferably, the servo detector 32 includes a counter which is reset with every detected index signal and which counts to (or from) a preset value and asserts the soft index signal, in the event that a soft error in reading the index field has occurred.

Figure 2:
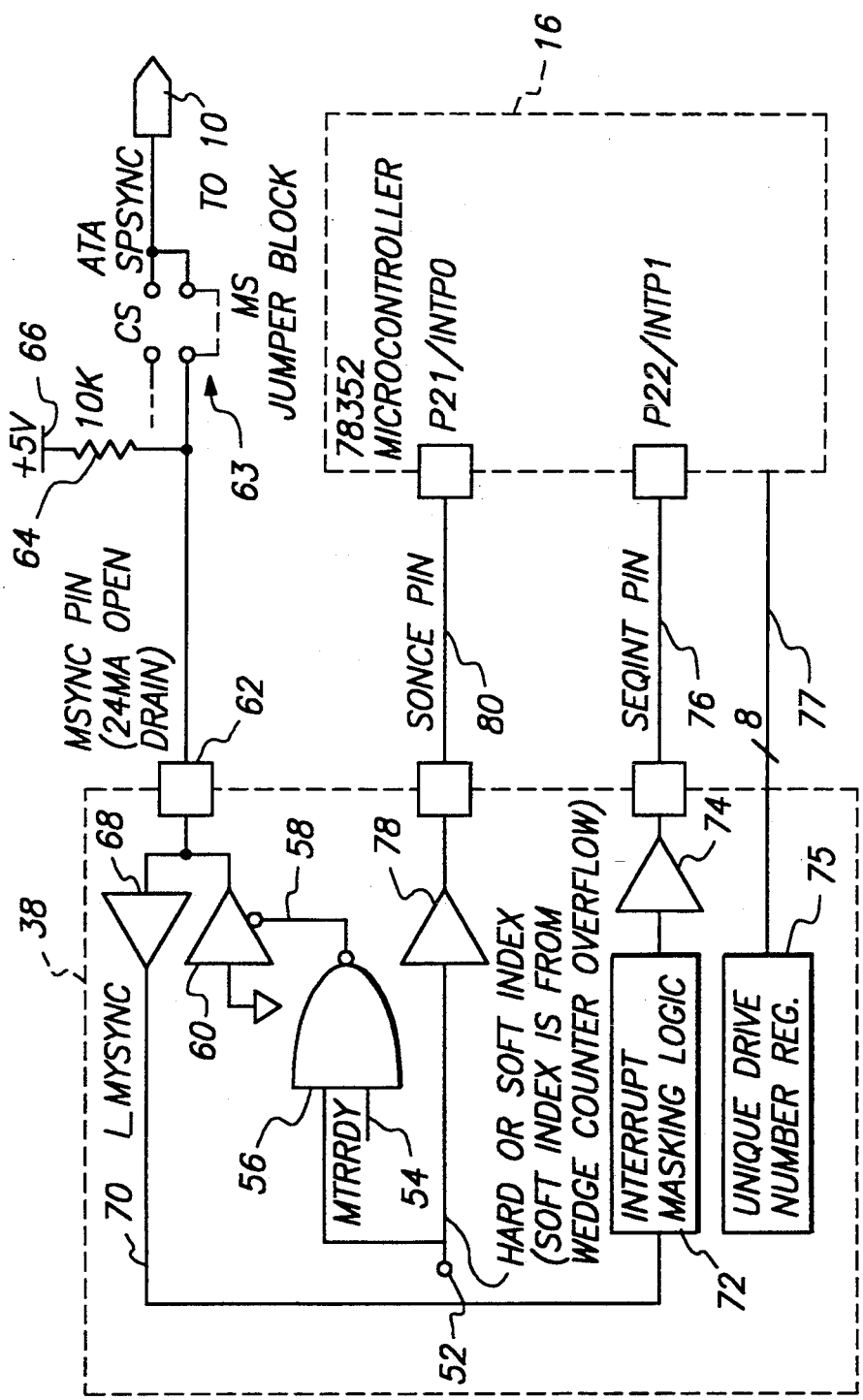
FIG. 2 is a more detailed block diagram of a portion of circuitry of one of the drives within the FIG. 1 array.

With reference to FIG. 2 the motor speed supervisor circuit 38 receives the index signal put out by the servo detector 32 on an internal path 52. The index signal on the path 52 is compared to a spindle motor ready signal on a path 54 by a NAND circuit 56. An output on a path 58 indicates that the spindle motor 20 is operating at a nominal rotational velocity such as 4500 RPM, and that an index pulse is present. This output on the path 58 is used to control a line driver 60 to cause it to pull a line 62 to a logical low level for the duration of the index pulse. The line 62 extends e.g. through an interface jumper 63 to a path leading to the spindle synchronization party line 10. A low current pull-up resistor 64 is connected to pull the line 62 up to a supply potential, such as +5 volts supplied over a drive voltage supply bus 66.

The bus driver of each drive 1-5 pulls the party line 10 to a logical low level during the particular drive's index interval. When another drive has pulled the spindle synchronization party line 10 low, this fact is sensed by a bus receiver 68 which is connected to the party line 10 via the internal path 62, and results in a signal I_MYSYNC on a path 70. The I_MYSYNC signal passes through interrupt masking logic 72, which enables the signal to be masked out (ignored) under program control. A line driver 74 buffers the I_MYSYNC signal and passes it over a line 76 directly to an interrupt port INTP1 of the microcontroller 16. A falling edge of another drive's MSYNC signal on the spindle synchronization party line 10 will interrupt the monitoring drive's microcontroller 16 and cause it to execute the FIG. 6 interrupt service routine.

The local drive's index signal on the path 52 is also passed through a line driver 78 and over a line 80 to another interrupt port INTP0 of the microcontroller 16. The interrupt INTP0 is a higher priority interrupt than the interrupt INTP1, so that when INTP0 is asserted, an index interrupt service routine is executed in lieu of any other activity being carried out by the microcontroller 16. A pertinent portion of each drive's index interrupt service routine is described below in connection with FIG. 7.

The motor speed supervisor circuit 38 also includes a register 75 containing a unique value associated with the particular drive. Conveniently, the number may be in a range from 0-7 and correspond to a SCSI identification number as set at a jumper block associated with the drive interface electronics 12. Other unique drive identifier numbers may be provided and stored in the register 75, whether by jumper block connections, or by firmware programming. Known techniques may be employed within the array of drives so that unique numbers may be arbitrarily selected by each drive and altered in the event that another drive has selected the same number. The unique drive number register 75 is read by the microcontroller 16 via a data bus 77 and buffer/driver circuits (not shown in FIG. 2).

Figure 3:
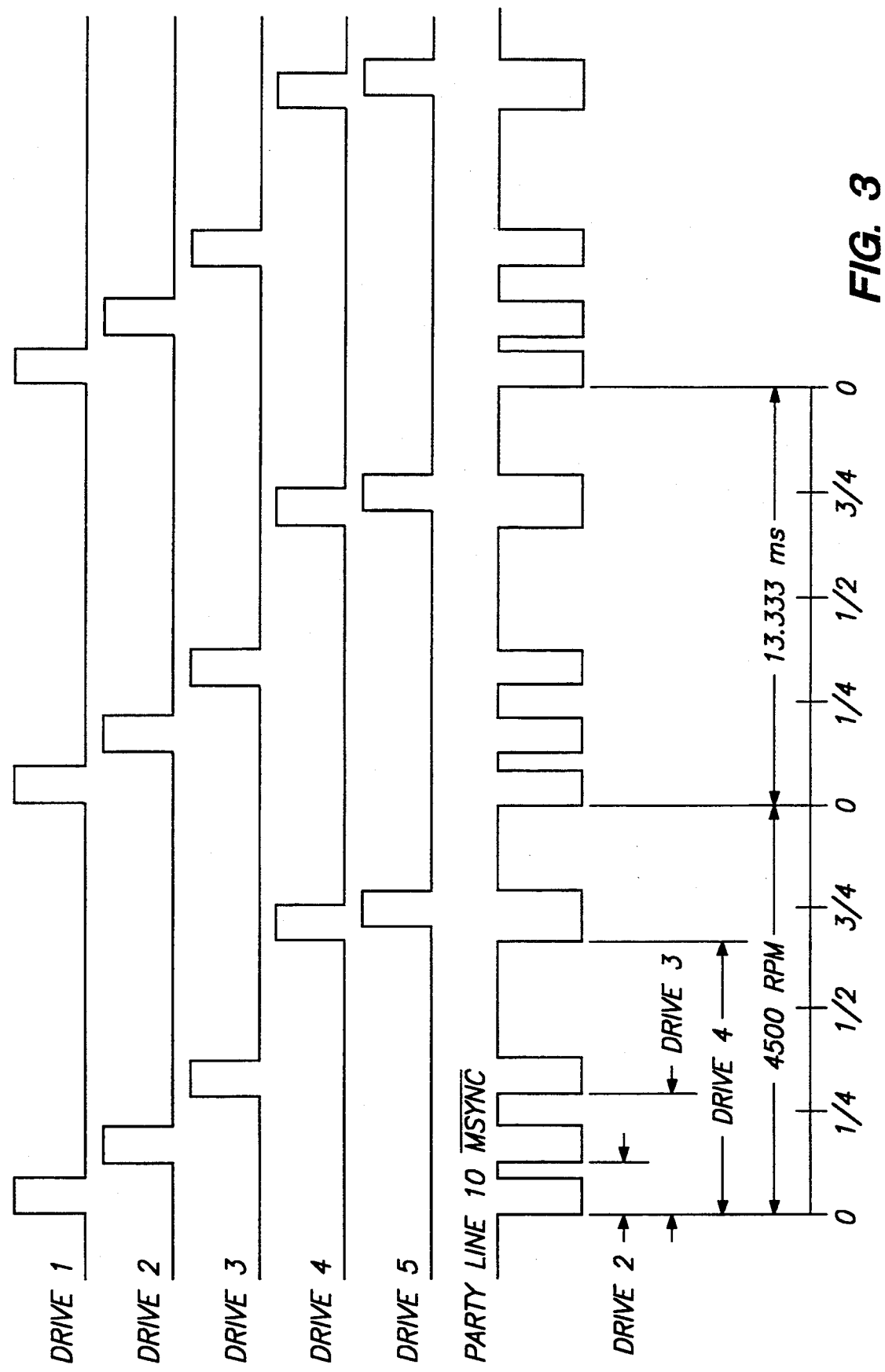
FIG. 3 is a first timing diagram illustrating initial lack of synchronization of the five disk drives of the FIG. 1 array.

Before spindle synchronization, the drives 1–5 are controlling their respective spindle motors 20 to rotate at the nominal spindle velocity of e.g. 4500 RPM. However, as illustrated in FIG. 3, the once-per-revolution index marker signals are not synchronized. The spindle synchronization party line 10 is monitored e.g. by the disk drive 1. Immediately following the beginning of drive 1's own spindle index marker signal (denoted by the vertical line in the lower half of FIG. 3) a next falling edge of the $\overline{\text{MSYNC}}$ signal marks the beginning of drive 2's spindle index marker signal. At an interval thereafter, another falling edge of the $\overline{\text{MSYNC}}$ signal marks the beginning of drive 3's spindle index marker signal. Another falling edge of the $\overline{\text{MSYNC}}$ signal on the party line 10 marks the beginning of drive 4's index marker signal. Since drive 5's spindle index marker signal on the party line 10 overlaps the marker signal of drive 4, a separate falling edge of the $\overline{\text{MSYNC}}$ signal is not present on the party line 10 for drive 5. The next falling edge of the $\overline{\text{MSYNC}}$ signal marks the next repetition of drive 1's index marker signal. For reasons which will be more fully understood later on, it is important to note in FIG. 3 that the drive 2 falling edge within $\overline{\text{MSYNC}}$ occurs within one quarter of a revolution time interval, whereas the drive 3 falling edge occurs more than one quarter of a revolution and less than three quarters of a revolution. The same condition applies to the falling edge of drive 4 within the $\overline{\text{MSYNC}}$ composite signal on the spindle synchronization party line 10.

Figure 4:
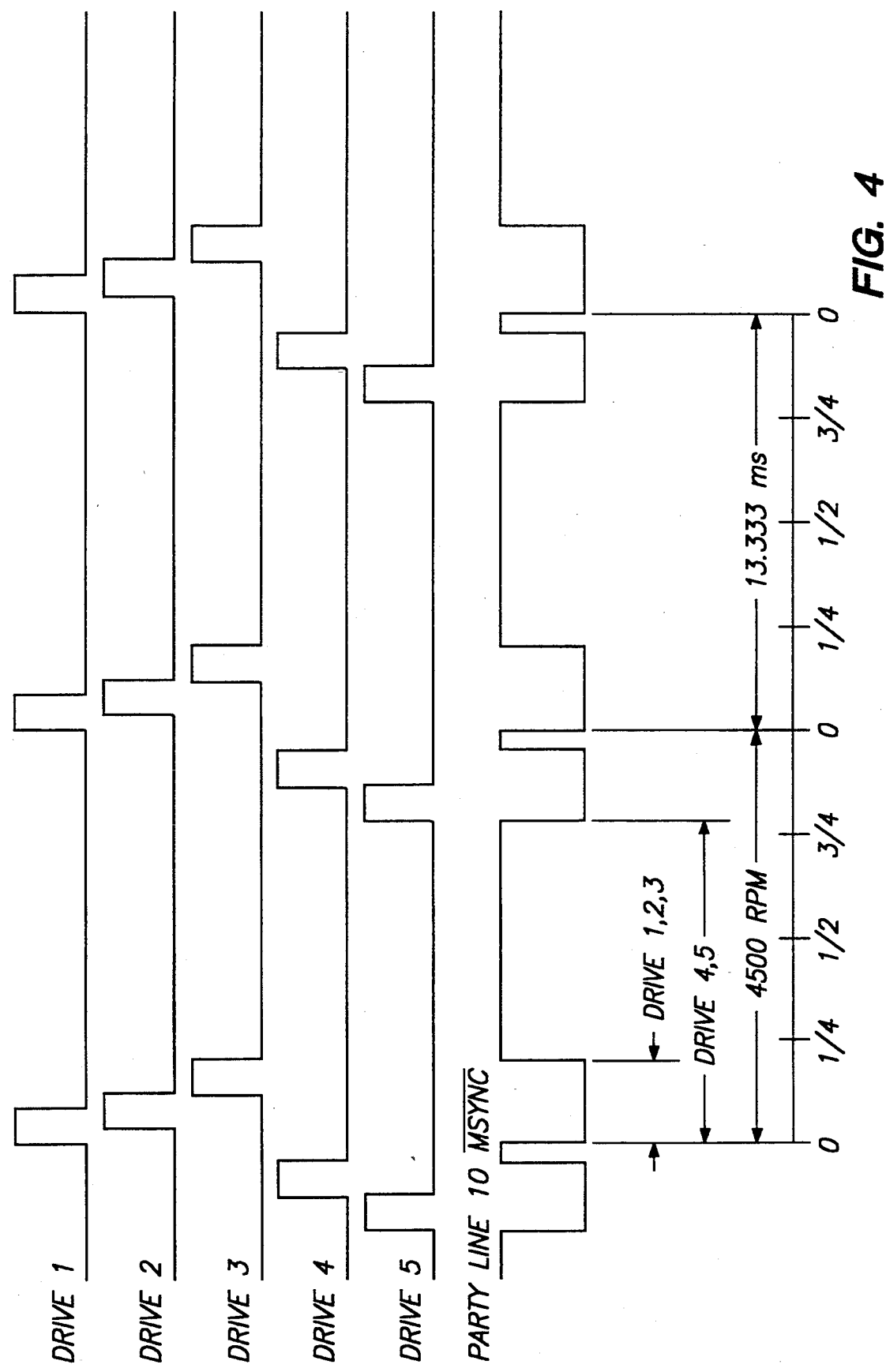
FIG. 4 is a second timing diagram illustrating convergence toward spindle synchronization of the five disk drives of the FIG. 1 array.

Turning now to FIG. 4, after the method of the present invention is applied within the interconnected drives 1–5, convergence of individual marker signals within the $\overline{\text{MSYNC}}$ composite signal begins to occur. Drives 1–3 are within a single pulse cluster, and drives 4 and 5 are within a second pulse cluster. Both pulse clusters of the $\overline{\text{MSYNC}}$ composite signal are now within a time interval of one quarter of one revolution of each disk spindle. With drive 1's index marker as the reference, drives 2 and 3 are within plus one quarter of one revolution, whereas drives 4 and 5 are within minus one quarter of one revolution.

Figure 5:
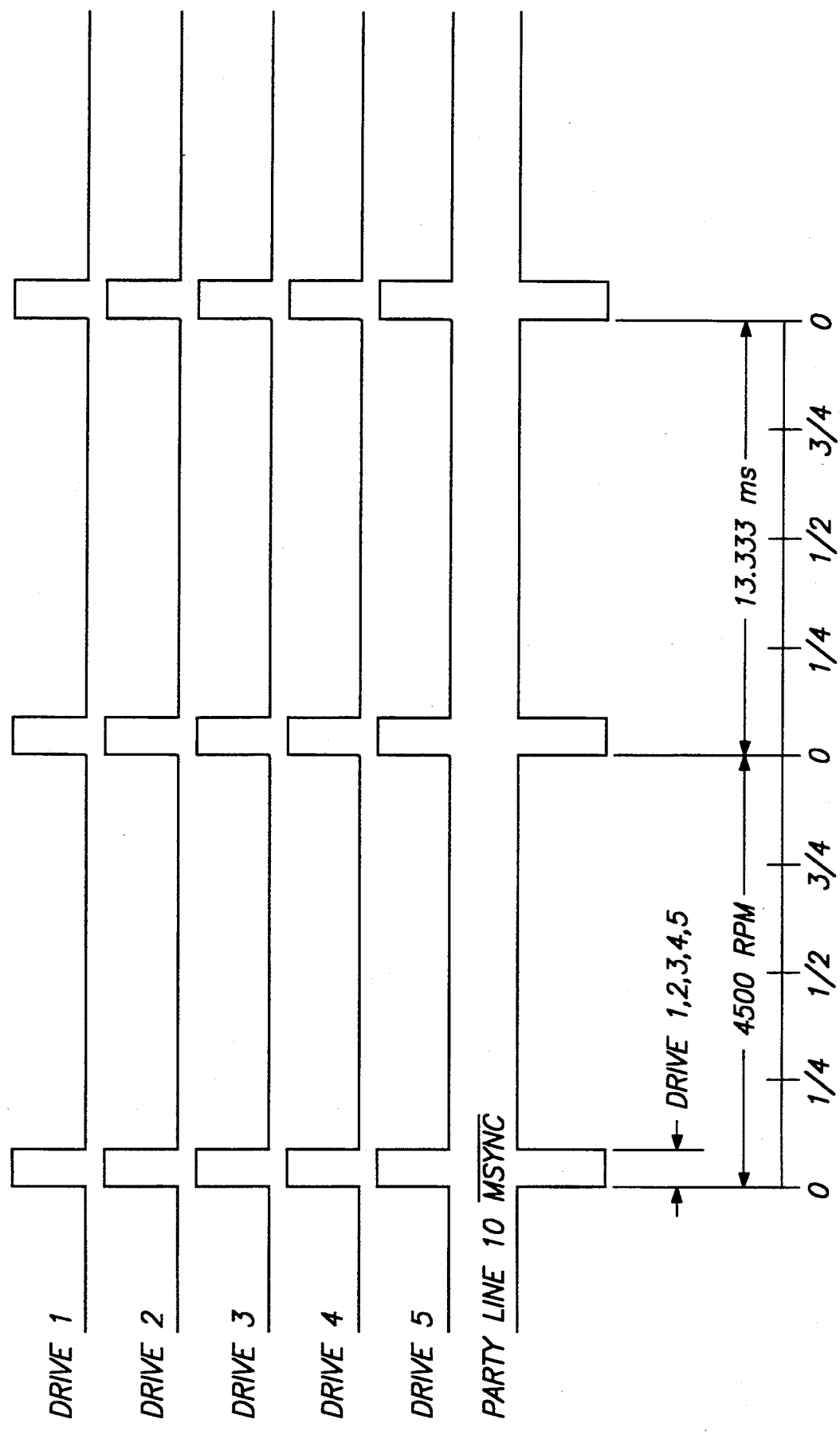
FIG. 5 is a third timing diagram illustrating spindle synchronization achieved in accordance with the method of the present invention.

FIG. 5 illustrates proper alignment of all five spindle index marker signals after each drive has independently applied the control method of the present invention. There is only one composite spindle synchronization pulse cluster appearing within the $\overline{\text{MSYNC}}$ composite signal, and its width approximates the width of each spindle index marker signal put out by each of the drives 1–5. This condition represents a phase lock steady-state condition during which each drive actively monitors the $\overline{\text{MSYNC}}$ composite signal present on the spindle synchronization party line 10 and maintains convergence through spindle motor vernier speed corrections applied through each of the speed control loops of the drives.

Figure 6:
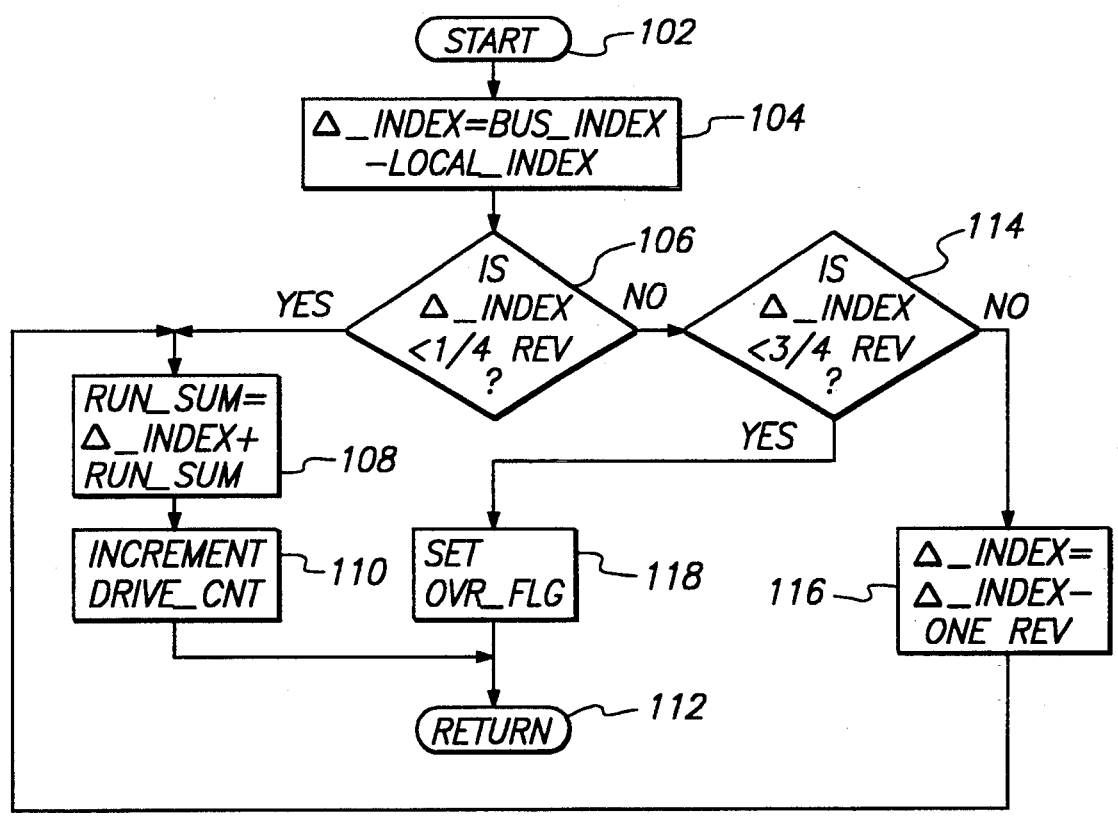
FIG. 6 is a flowchart of an MSYNC interrupt service routine executed by each one of the drives within the FIG. 1 array in achieving and maintaining masterless synchronization of spindles in accordance with the present invention.

FIG. 6 illustrates an interrupt service routine which is executed by each disk drive 1–5 when it encounters an edge in the $\overline{\text{MSYNC}}$ composite signal other than its own. The FIG. 6 interrupt service routine measures every other detectable index marker reference pulse present within the $\overline{\text{MSYNC}}$ composite signal and compares the phase relationship between the $\overline{\text{MSYNC}}$ pulses and the local drive's internal index signal. The result of this comparison is a computation of a phase relative to the local drive's internal index marker signal which is the "best guess" as to a "center of gravity" of pulse clusters which are within plus or minus one quarter revolution of the local drive's index marker. This "center of gravity" phase then serves as a reference phase which can be used to command slight motor speed changes at the local drive over fixed time intervals so that the phase difference between the local drive's internal index marker and the "center of gravity" phase is reduced to approach zero (which represents phase lock).

For the present explanation of the FIG. 6 flowchart, the activities of drive 1 will be explained. But, it is to be understood that the same interrupt service routine is being executed by the other drives 2–5. When a falling edge is detected and applied to the INTP1 interrupt pin of the drive microcontroller 16, the FIG. 6 routine is called, and a start node 102 is reached. Immediately, the program determines delta index as a function of the time difference between the detected falling edge and the time of the drive's local index marker signal. This calculation is carried out at a process step 104. At a logical node 106, the program determines whether the calculated delta index is less than the time interval of one quarter of one revolution of the disk. (With the present example of a disk speed of 4500 RPM, each nominal rotational interval represents 13.333 milliseconds, and one quarter of that interval represents 3.33325 milliseconds.) If so, a process step 108 determines a new running sum value RUN_SUM as a sum of the delta index calculated at process step 104 and the most recent running sum value RUN_SUM. A process step 110 then increments a drive counter 110 which takes into account the number of disk drives present on the spindle synchronization party line 10. These values are then saved for use by the FIG. 7 local index interrupt service routine.

If the delta index value is not less than one quarter rotational latency, a second logical node 114 tests whether the delta index signal is less than three quarters of a rotational latency. If not, meaning that the delta index signal is greater than three quarters of a rotational latency, the delta index value is made into a positive number by a process step 116 which subtracts the latency of one revolution from the delta index signal calculated at the process step 104. If the delta index signal lies between one quarter and three quarters of a rotational latency, an overrange flag OVR_FLG is set at a step 118, and this value is used within the FIG. 7 local index interrupt service routine to alter the local drive's rotational speed slightly, and in a unique way. After these steps are taken, a return is made at a return node 112, and the drive microcontroller 16 resumes its other tasks. When a next falling edge is detected within the $\overline{\text{MSYNC}}$ composite signal on the party line 10, the FIG. 6 service routine is repeated. This process of repeating the FIG. 6 service routine continues until the local index interrupt is applied at INTP0 of the microcontroller 16.

Figure 7:
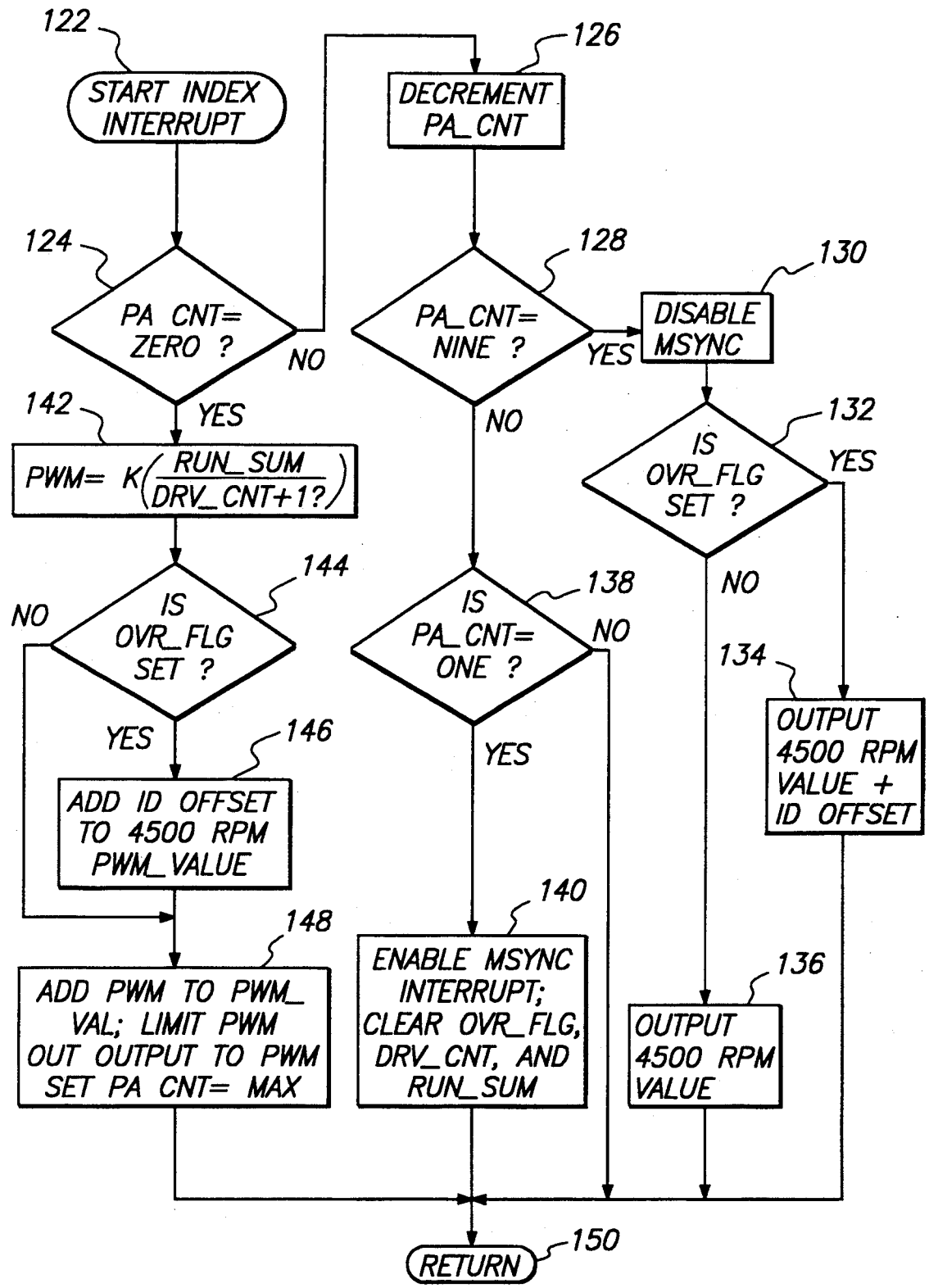
FIG. 7 is a flowchart of an INDEX interrupt service routine executed by each one of the drives within the FIG. 1 array in achieving and maintaining masterless synchronization of spindles.

The local index interrupt service routine depicted in FIG. 7 begins at a start node 122 and immediately progresses to a first logical node 124 which determines whether a process accumulation count PA_CNT is equal to zero. This count represents a predetermined number of rotations (spindle index markers) which have occurred since the last synchronization correction. In the present example, a ten-revolution interval is selected between synchronization corrections. If this count has not reached zero, a process step 126 decrements the process accumulation count by one.

A second logical node 128 then determines whether the process accumulation count is equal to nine, meaning that the last count was a zero count as determined at the first node 124. If the process accumulation count equals nine, a process step 130 disables the $\overline{MSYNC}$ composite signal, by use of the interrupt masking logic 72 in FIG. 2. Then, a third logical node 132 in the FIG. 7 index service routine tests whether the overrange flag is set. If it is, a process node 134 causes the spindle motor controller 18 to put out a driving signal appropriate for the nominal 4500 RPM disk rotational velocity and which is slightly offset by a unique value. In the present example, the unique value is derived from a disk-specific number, such as the SCSI ID number, which is directly available by jumper setting, etc. The unique value causes the disk to rotate at a speed which is a fraction of a percent deviation from nominal speed, but which speed causes the drive's index marker within the $\overline{MSYNC}$ composite signal on the party line 10 to move in time relative to the other index markers of the other drives. This relative motion leads to a gathering or convergence of the individual index markers within the $\overline{MSYNC}$ composite signal and soon, other falling edges are detected to be within one quarter revolution of the local drive's index marker signal. This condition is depicted in FIG. 4.

If the overrange flag OVR_FLG is not set, as tested at the third logical node 132, a process node 136 causes the spindle motor controller 18 to regulate disk rotational speed at the nominal spindle speed of 4500 RPM in this example.

If the process accumulation count PA_CNT is not nine, as tested at the node 128, a fourth node 138 tests whether this count has reached one. If so, a process step 140 enables the $\overline{MSYNC}$ interrupt at the interrupt masking logic 72, clears the overrange flag OVR_FLG, clears the drive count value DRV_CNT, and also clears the running sum count RUN_SUM. A return node 150 is reached from the process steps 134, 136 and 140, and is also reached if the process accumulation count has not yet reached one, as tested at the node 138.

When the process accumulation count PA_CNT reaches zero, as tested at the first logical node 124, a process step 142 calculates a spindle motor speed correction value in accordance with the relation:

$$PWM = k \left( \frac{RUN\_SUM}{DRV\_CNT + 1} \right)$$

This value represents a very small speed correction value for correcting the phase of the local drive index marker signal, so that it begins to converge toward a gathering of the other spindle index marker signals within the $\overline{MSYNC}$ composite on the spindle synchronization party line 10. Another logical node 144 again tests whether the overrange flag OVR_RNG is set. If so, the unique value (derived from the local drive's interface ID number, for example) is added to the nominal speed command value PWM_VALUE at a process step 146. The resultant sum is then combined with the PWM value calculated at the process step 142 at a subsequent process step 148 and the resultant sum is put out to the spindle motor controller 18 by the microcontroller 16. In this process step 148, the process accumulation count is returned to its maximum value, e.g. nine, and then the return node 150 is reached. If the overrange flag OVR_RNG is not set, as tested at the node 144, the process step 146 is bypassed.

To summarize, after each disk drive spindle motor 20 has been started, each drive measures its speed and adjusts its speed reference value (PWM_VALUE) so that the measured spindle speed is maintained at the nominal spindle speed (which is 4500 RPM in this example). The reference value PWM_VALUE is then saved and called by the microcontroller 16 during servo service routine interrupts in order to adjust actual spindle speed to the nominal speed.

In order to bring about spindle synchronization of the drives 1-5, each drive causes its speed to change by some unique amount. In the present example, reference to a drive's interface ID number provides a unique value for offsetting the local drive's spindle speed from nominal by some unique and very small amount. Other unique numbers may be assigned to the drives of the array, and when so assigned, these numbers will be used to achieve spindle speed synchronization.

When a "center of gravity" of spindle index pulse clusters present within the $\overline{MSYNC}$ composite signal present on the path 10 lies within plus or minus one quarter revolution of the local drive's own index marker signal, the local drive eliminates the unique offset and makes measured phase corrections over time until the local spindle reference marker converges with the $\overline{MSYNC}$ composite. Every drive on the party line 10 is simultaneously making these minute phase corrections, and the net result of these simultaneous actions is that spindle synchronization throughout the array of drives 1-5 is established and maintained. In this method, no single drive is acting as "master", and synchronization requires only a single two-way synchronization party line 10.

By limiting speed control loop phase adjustments to the $\overline{MSYNC}$ composite "center of gravity" of pulse clusters to within plus or minus one quarter revolution of the local index marker, a false lock-up condition, which can otherwise occur at 180 degrees phase shift between the local spindle reference and the pulse cluster of the composite signal, is precluded. Also, the gain of the composite spindle phase control loop is made very low, so that no drive of the array dithers excessively about the converged $\overline{MSYNC}$ composite marker.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A masterless disk drive array including a plurality of disk drive units operating in phase synchronism at a predetermined nominal rotational speed, wherein each said disk drive unit comprises:
   disk media, transducer means for writing information to and reading information from the media, identification means for associating a unique id number with each said disk drive unit, motor means for rotating the media, including means for rotating the media at a unique rotational speed determined by said id number, said unique rotational speed approximating said predetermined nominal rotational speed, means for outputting a phase triggered index marker pulse during each revolution of the media, means for receiving index marker pulses generated from said plurality of disk drive units, means for calculating a center of gravity of index marker pulses clustered within approximately plus or minus one quarter revolution of each said drive unit's own index marker pulse, and phase control means for varying the rotational speed of the media to converge each said drive unit's own index marker pulse toward said center of gravity.

2. A method for synchronizing the rotation of disk spindles of a plurality of hard disk drives interconnected by a spindle reference party line in a masterless array to operate in phase and rotational velocity synchronous mode at a predetermined nominal rotational velocity, comprising within each said drive of the array the steps of:

associating a unique identification number with each said drive, rotating each said drive's disk spindle at a unique rotational velocity based on said identification number, said unique rotational velocity approximating said predetermined nominal rotational velocity, sending a phase triggered index marker pulse generated within each said drive during each rotation of the disk spindle thereof to the party line, monitoring index marker pulses present on the party line and calculating a center of gravity of index marker pulses located within approximately plus or minus one-quarter revolution of each said drive's own index marker pulse, and adjusting the rotational velocity of each said drive's disk spindle to converge toward the center of gravity.

3. A method for causing data storage disk spindles of a plurality of hard disk drives connected together by a single spindle reference party line to operate in phase synchronism at a predetermined rotational velocity and without designation of one of said drives as a master drive comprising within each drive of the plurality the steps of:

sending an index marker pulse generated within each disk drive to mark in time a beginning of each rotation of the disk spindle thereof to the party line, rotating the disk spindle at a slightly different rotational velocity from every other drive of the plurality, monitoring drive pulses present on the spindle reference party line from other disk drives of the plurality to locate a center of gravity of pulse clusters which is within approximately plus or minus one quarter revolution of the drive's own index marker pulse, upon detection of a said center of gravity, ceasing to rotate the disk spindle at a slightly different rotational velocity during a second phase, adjusting the rotational phase of each drive to converge toward the center of gravity until all drive pulses present on the spindle reference party line converge into a single composite marker pulse present on the spindle reference party line, and maintaining convergence of the drive pulses during continuing operations of the disk drives by monitoring the spindle reference party line and making slight phase adjustments of the rotational phase of each drive, thereby phase locking all of the disk spindles of the plurality of hard disk drives to a single composite index marker signal present on the party line.

4. The method set forth in claim 3 wherein the step of rotating the disk spindle at a slightly different rotational velocity from every other disk drive of the plurality comprises the step of offsetting the predetermined rotational velocity by a fractional amount derived from a unique number value assigned to each drive of the plurality.

5. The method set forth in claim 4 wherein the unique number value is a disk drive unique interface identification number which is pre-established at the hard disk drive.

6. A masterless array of hard disk drives having disk spindles rotating in phase synchronism, comprising:

a single spindle reference party line interconnecting each one of the disk drives, a plurality of disk drives including:

spindle control means for regulating a disk spindle to rotate at a common nominal rotational velocity, spindle index marker generator means for generating and putting out a spindle index marker signal, drive pulse sending means for sending a drive pulse to the party line, the drive pulse being a function of the spindle index marker, monitoring means for monitoring drive pulses present on the spindle reference party line from other disk drives of the array, the spindle control means responsive to the drive pulse sending means and to the monitoring means, and including first means for causing the drive to rotate at a slightly different rotational velocity from every other drive of the array during a first control phase, second means for locating a center of gravity of pulse clusters within approximately plus or minus one quarter revolution of the drive's own index marker pulse, third means for ceasing to rotate the disk spindle at a slightly different rotational velocity during a second phase upon detection of said center of gravity, and fourth means for adjusting the rotational phase of each drive to converge toward the center of gravity during the second control phase until all drive pulses present on the spindle reference party line converge into a single composite marker pulse present on the spindle reference party line, the spindle control means for maintaining convergence of the drive pulses during continuing operations of the disk drives by monitoring the spindle reference party line and making slight phase adjustments of the rotational phase of each drive, whereby all of the disk spindles of the array are locked to a single composite index marker signal present on the party line.

7. The masterless array of hard disk drives set forth in claim 6 wherein the spindle control means includes a programmed digital microcontroller.

8. The masterless array of hard disk drives set forth in claim 6 wherein each disk drive of the array is assigned a unique identifier value and wherein the spindle controller means uses the unique identifier value for causing the drive to rotate at a slightly different rotational velocity.

9. The masterless array of hard disk drives set forth in claim 4 wherein the unique identifier value corresponds to a drive interface identification number preset for each said drive.

10. The masterless array of hard disk drives set forth in claim 6 wherein the spindle index marker generator means includes means for reading a spindle marker field recorded in data tracks of the disk drive, and further includes preset counter means for generating a soft spindle index marker signal in the event that the spindle marker field is not read.

* * * * *